May 31, 1960     J. C. BENNETT     2,938,735
SECTIONAL BOAT TRAILER
Filed Nov. 15, 1954     2 Sheets-Sheet 2
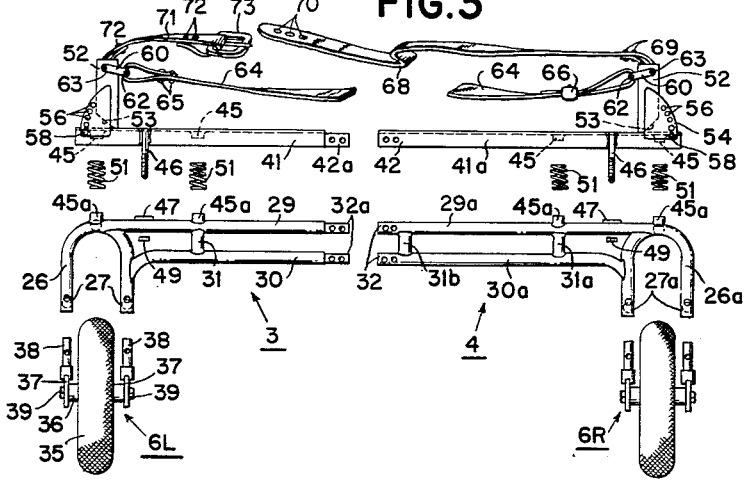
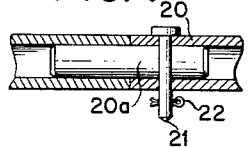
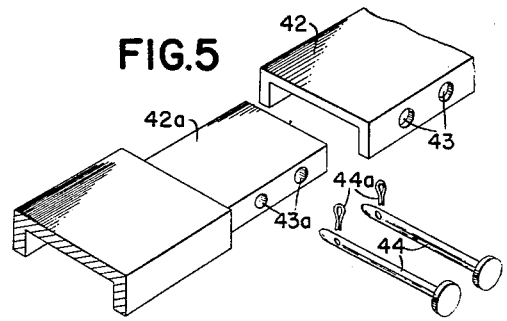
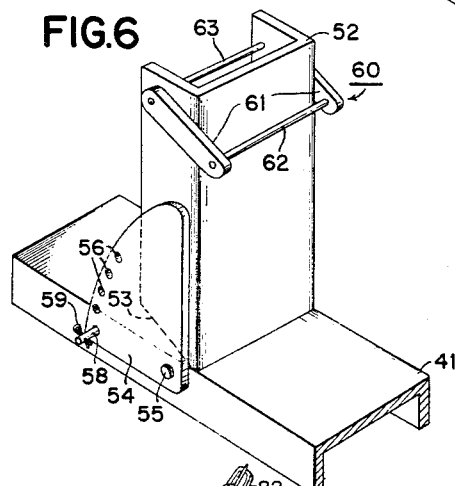
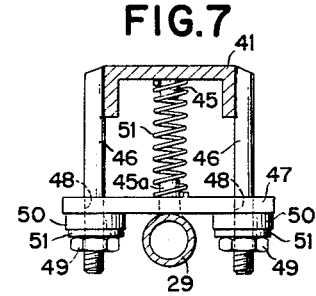
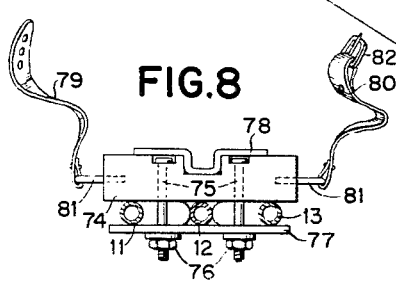
*INVENTOR.*
JOHN C. BENNETT United States Patent Office 2,938,735
Patented May 31, 1960

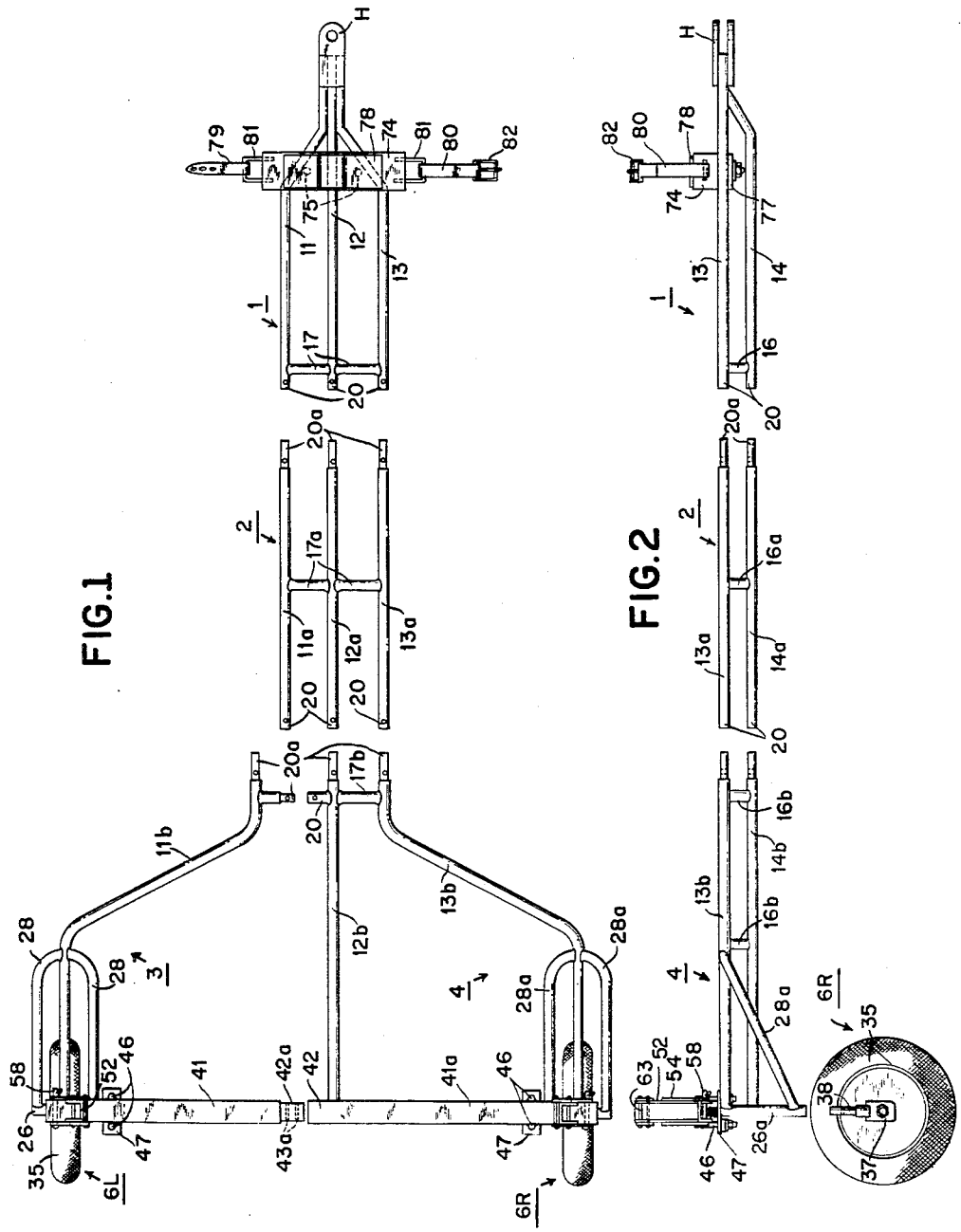

2,938,735

SECTIONAL BOAT TRAILER

John C. Bennett, Millbrook, N.Y.; Charlotte S. Bennett, administratrix of said John C. Bennett, deceased Filed Nov. 15, 1954, Ser. No. 468,688

5 Claims. (Cl. 280—34)

This invention relates to a trailer and more particularly to a readily disassembled boat trailer.

Frequently it is desirable to use a trailer in traveling to a destination but not on the return trip. It is inconvenient to pull a trailer and therefore it is desirable to eliminate the necessity of pulling it when it is not actually being used. Prior art discloses a number of trailers that have features directed to accomplish this purpose, some examples being the provision of pivoted wheel mountings whereby the wheels may be folded inside the trailer box or where the box is hinged to fold flat. However, the trailers heretofore designed have shortcomings that made them unsuitable for many purposes; for example, in order to be folded into a desired space, the trailer must be of a limited size or limited load capacity.

One object of the present invention is to provide a full sized trailer having considerable hauling capacity that may be readily stored in a relatively small space when not in use.

Another object of the invention is to provide a trailer that may be readily disassembled into relatively small parts whereby the disassembled trailer may be stored in a space that is small relative to the size of the assembled trailer.

A further object of the invention is to provide a boat trailer that is readily adaptable to boats of varying lengths and widths.

Still another object is the provision of a light weight trailer the disassembled pieces of which may be handled with ease.

Yet another object is the provision of spring supports that are suitable without adjustment for light loads as well as heavier loads.

Other objects of the invention will be pointed out in the following description and illustrated in the accompanying drawings, which disclose, by way of example, the principle of the invention and the best mode which has been contemplated of applying that principle.

In the drawings:

Figure 1 is an exploded top view of the trailer.

Figure 2 is an exploded side view of the trailer.

Figure 3 is an exploded rear view of the trailer.

Figure 4 is a sectional showing of one of the readily separable joints.

Figure 5 is a partial view of the spring supported load member of the trailer and the separable joint thereof.

Figure 6 is a partial view of the load support member showing the means for adjusting to various width loads.

Figure 7 is a view of the means for fastening the load support member to the trailer proper.

Figure 8 is a view of a front load support member.

Since the disassemblage feature of the trailer is of great importance, the exploded views of Figures 1, 2 and 3 best illustrate the manner of assembling without concealing the general appearance of the assembled trailer.

Referring to Figures 1, 2 and 3, the trailer comprises a tongue and hitch member 1, a tongue extension member 2, a pair of non-symmetrical frame and wheel support members 3 and 4, wheel and wheel mount units 6L (6 left) and 6R (6 right). The tongue and hitch member 1 comprises four tubular steel members 11, 12, 13 and 14. The members 12 and 14 are joined at one end by a tubular steel member 16 that is suitably fixed thereto, for example, by welding. The members 11, 12 and 13 are joined at one end by tubular members 17 that are affixed therebetween, for example by welding. The other ends of the members 11, 13 and 14 are shaped to join the straight member 12, as shown, and are fastened together, as by welding, whereby the tongue and hitch member 1 becomes a rigid unit. Any suitable trailer hitch may be attached to the member 1, for example, the one shown in Figures 1 and 2 and designated H.

The left ends of the tubular members 11, 12, 13 and 14, as viewed in Figures 1 and 2, form female socket members as shown in section in Figure 4 and designated 20. The female socket members contain aligned holes in opposite sides to receive pins 21 as shown in Figure 4.

The tongue extension member 2 comprises four parallel tubular steel members 11a, 12a, 13a and 14a that are rigidly joined by welded members 16a and 17a and are spaced to align with the four members 11, 12, 13 and 14. The right ends of the members 11a, 12a, 13a and 14a carry cylindrical solid steel members 20a, as shown in Figure 4, that are suitably fixed thereto, for example, by welding, and form male socket members each having a hole drilled therethrough for receiving one of the pins 21. When the male socket members 20a of the tongue extension unit 2 are joined with the female socket members 20 of the tongue and hitch unit 1 and pins 21 are inserted through the aligned holes in the male and female socket members and the pins 21 are secured in place, for example, by cotter pins 22 passing through holes in the pins 21, as shown in Figure 4, the units 1 and 2 are rigidly joined as a single unit. The left ends of the tubular members 11a, 12a, 13a and 14a are formed into female socket members 20 similar to those described for the tubular members 11, 12, 13 and 14.

The frame and wheel support members 3 and 4, as shown in Figures 1 and 3, are non-symmetrical. The member 3 comprises a longitudinal member 11b and a vertical fork-shaped member 26, shown in Figures 2 and 3, containing a pair of female socket members 27 similar to the female socket members 20 described hereinbefore. The fork-shaped member 26 is welded to the member 11b at the center point of the fork. The member 26 is further braced by strut members 28, shown in Figures 1 and 2, that are welded to the open ends of the fork-shaped member 26 and to the longitudinal member 11b. A horizontal cross member 29, also of tubular steel, is welded to the center point of the fork-shaped member 26 in the plane of the member 26 and at right angles to the legs of the member 26. A second horizontal cross member 30, also of tubular steel, is welded to the inside leg of the member 26 and extends parallel to the cross member 29. The members 29 and 30 are joined by a tubular steel member 31 that is welded therebetween. The free ends of the members 29 and 30 carry male socket members 32a that are identical to the male socket members 20a except that they contain two pin holes each.

The frame and wheel support member 4 comprises a longitudinal member 13b, a vertical fork-shaped member 26a, strut members 28a, cross members 29a and 30a, and a joining member 31a all of which are similar respectively to the hereinbefore described members 11b, 26, 28, 29, 30 and 31. The fork-shaped member 26a also has female socket members 27a similar to the socket members 27. The cross members 29a and 30a are longer than their counterparts 29 and 30 and are connected by an additional joining member 31b that is similar to the members 31 and 31a. The free ends of the cross members 29 and 30 comprise female socket members 32 having two sets of holes so positioned that they align with the holes of the male socket members 32a when the socket members are joined. The frame and wheel support member 4 also includes a pair of parallel tubular steel members 12b and 14b that are positioned one above the other and extend longitudinally of the trailer. The left ends of the members 12b and 14b, as viewed in Figures 1 and 2 are welded respectively to the cross members 29a and 30a in alignment with the points where the joining member 31b is attached. The members 12b and 14b are connected by a pair of joining members 16b that are welded therebetween similar to the members 16 and 16a on the respective units 1 and 2. A female socket member 20 is welded to the longitudinal member 12b so as to be aligned with a male socket member 20a that is welded to the hereinbefore described frame and wheel support member 11b, when the socket members 32 and 32a of the cross members 29, 29a, 30 and 30a are joined.

Male socket members 20a fixed to the free ends of the longitudinal members 11b, 12b, 13b and 14b align with the hereinbefore described female socket members 20 that are formed on the left ends, as viewed in Figures 1 and 2, of the longitudinal members 11a, 12a, 13a and 14a. When all of the hereinbefore described male socket members are joined with the related female socket members and all are locked together by pins 21 and cotter pins 22, the parts that are generally designated 1, 2, 3 and 4 comprise a single rigid unit. The tongue extension member 2 may be omitted and the tongue and hitch member 1 joined directly with the members 3 and 4 to form a short trailer frame where the load to be hauled is not of sufficient length to require the tongue extension.

Referring to Figures 1, 2 and 3, the pair of wheel units generally designated 6L and 6R each comprise a wheel 35, an axle 36, a pair of axle plates 37 and a pair of male socket members 38. The axle plates are welded to the male socket members and are retained on the axles by nuts 39. The male socket members 38 align with the female socket members 27 of the fork-shaped members 26 hereinbefore described, and are held together by pins 21 and cotter pins 22.

A load support bar comprising a pair of inverted iron channel members 41 and 41a are adapted for resilient mounting on the respective cross members 29 and 29a. A channel member 42a having outside measurements equal to the inside measurements of the channel member 41 is affixed inside the right hand end of the member 41, as viewed in Figure 3, for example by welding, and extends a short distance therefrom forming a male socket member, as shown in Figure 5. The male socket member 42a has a pair of adjacent holes 43a drilled through both sides thereof. The channel member 41a has a pair of adjacent holes 43 drilled through both sides thereof near the left hand end, as viewed in Figure 3, forming a female socket 42, whereby the male socket member 42a may be fitted inside the female socket member 42, the pairs of holes 43 and 43a in the two socket members 42a and 42 aligned, and pins 44 inserted through the holes and locked in place by cotter pins 44a similar to the pins 21 and cotter pins 22 described hereinbefore.

The channels 41 and 41a each have a pair of studs 45 affixed, for example, by welding, inside the channels, extending downwardly and spaced as shown in Fig. 3. Each of the channels 41 and 41a has a pair of threaded bolts 46 welded thereto, in the manner shown in Figure 7, a bolt 46 of each pair being on either side of the channel 41 (or 41a) with the threaded end thereof extending below the open side of the channel. Affixed to the cross members 29 and 29a, for example by welding, extending upwardly and having the same spacing as the hereinbefore described studs 45 are studs 45a. Affixed to the cross members 29 and 29a, for example by welding, and positioned between the studs 45a are a pair of plates 47. Each plate 47 contains a pair of holes 48 positioned to receive the bolts 46, as shown in Figure 7. Each bolt fits loosely in the associated hole 48 and is prevented from being removed therefrom by a nut 49. A rubber cushion 50 and a washer 51 are placed between the plate 47 and the nut 49 to act as a shock absorber.

The channel members 41 and 41a and the cross members 29 and 29a are resiliently held apart by springs 51 inserted therebetween as shown in Figure 7. Each spring 51 is held in place by a pair of studs comprising one of the studs 45 and the stud 45a that is aligned therewith. The inner pair of springs 51 are heavier than the outer pair. The outer pair of springs act to absorb shock that would normally be transferred to a light load. The relatively stiff inner springs act to absorb the shock that would normally be transferred to heavier loads. If springs of one stiffness only were used, the lighter loads would not be sufficiently cushioned because the springs would have little effect. The heavier loads would not be sufficiently cushioned because the light springs would not be strong enough to keep the channel members 41 and 41a separated from the cross members 29 and 29a.

It will be apparent that, with the channel member 41 affixed to the cross member 29 and the channel member 41a affixed to the cross member 29a, the two cross member male sockets 32a and the male socket 42a of the channel member 41 may be moved simultaneously into the respective female socket members 32 and 42 to be retained therein, as described hereinbefore, by pins 21 and 44 and cotter pins 22 and 44a.

Referring to Figures 3 and 6, means are shown for mounting a load on the load support bar 41—41a. An adjustable support member is provided at each end of the support bar 41—41a. The adjustable support members are similar and the description of one will suffice for both. A channel iron member 52 having its upper end cut perpendicular to its length and its lower end 53 cut at an angle thereto in such a manner that the closed side of the channel is longer than its open side, is pivotally mounted on the support bar 41—41a. Quarter circle plates 54, only one of which is visible in Figure 7, are fixed to the sides of the channel member 52, for example by welding. The plates 54 extend below the angularly cut end 53 and are pivotally pinned to the channel member 41 by a pin 55 that passes through holes in the plates 54 and the channel member 41. A plurality of holes 56 are arranged along the arcuate edges of the quarter circular plates 54. Holes (not shown) are provided in the sides of the channel member 41, one in each channel wall, and are positioned for alignment with the holes 56. The channel member 52 may be pivoted about the pin 55 from a vertical position to one of a plurality of positions determined by the holes 56 and may be held in that position by passing a pin 58 through the selected holes 56 and the aligned holes (not shown) in the channel member 41. The pin 58 is locked in place by a cotter pin 59. As described hereinbefore, the supports 52 are adjustable to accommodate boats of varying widths. For narrow boats the members 52 are held in their vertical positions by placing the pins 59 through the lowermost holes 56 whereas, for wider boats, the members 52 are pivoted outwardly and are held in the selected position by placing the pins 59 in appropriate holes 56.

A link member 60 comprising two side pieces 61 and a pair of connecting cross pins 62 and 63 is pivotally pinned to the upper portion of each of the adjustable support members 52 by passing the cross bar 63 through holes in the sides of a member 52. A lower belt 64, as shown in Figure 3, is looped around the left hand pin 62 and held, for example by rivets 65; the free end is looped around the right hand pin 62 and its length is adjustable by means of a buckle 66. An upper belt 68 is looped around the right hand pin 63 and fastened by rivets 69. The free end of the belt 68 contains a plurality of buckle holes 70. A shorter strap 71 is fixed to the left hand pin 63 by rivets 72 and has a buckle 73 with which the strap 68 is fastened. The lower belt 64 is adjusted to support the boat free of the load support 41—41a and the upper belt 68 is adjusted to hold the boat snugly between the belts 64 and 68.

The front end of the boat is supported in a cradle member 74, shown in Figures 1, 2 and 8. The member 74 is fixed to the tongue and hitch member 1, for example, by bolts 75 and nuts 76 and a metal plate 77 that is tightened against the members 11, 12 and 13. The member 74 is cushioned, for example by a rubber piece 78, to prevent damage to the boat. The front end of the boat is held on the cradle member 74 by a pair of straps 79 and 80, which are riveted to U-bolts 81 bedded in the sides of the cradle 74. The strap 80 carries a buckle 82 which engages the strap 79.

Although the trailer is designed primarily as a boat trailer, it is obvious that a box could be detachably affixed to the load support member 41—41a and to the cradle member 74 or the framework of the trailer.

While there has been shown and described the fundamental novel features of the invention as applied to a preferred embodiment, it will be understood that various omissions and substitutions and changes in the form and details of the device illustrated and in its operation may be made by those skilled in the art without departing from the spirit of the invention. It therefore is the intention to be limited only as indicated by the scope of the following claims.

What is claimed is:

1. A trailer comprising a tongue member consisting of a plurality of longitudinal members; means for joining said longitudinal members at one end; a trailer hitch affixed to said one end; means for connecting the other ends of said longitudinal members in a spaced relationship; socket members formed on said other ends; a left frame member comprising a longitudinal member having a socket member complementary to one of first said socket members and having a horizontal socket member affixed thereto at right angles; a fork-shaped member; braces for said fork-shaped member; socket members formed on said fork-shaped members; cross members affixed to said fork-shaped member; a load support member resiliently affixed to one of said cross members; socket members formed on said cross members and said load support member; a right frame member comprising a longitudinal member having a socket member complementary to another of first said socket members, and a socket member affixed to said longitudinal member at right angles thereto and horizontal; a fork-shaped member; braces for said fork-shaped member; socket members formed on said fork-shaped member, cross members affixed to said fork-shaped member; a load support member resiliently affixed to one of said cross members; socket members formed on said cross members and said load support member and complementary to said socket members of said left cross members and load support member; a second longitudinal member affixed to said right frame member and having a socket member complementary to still another of first said socket members, and a socket member affixed to said longitudinal member at right angles thereto, horizontal, and complementary to said horizontal and right angled socket member of said left frame member; a pair of wheels rotatably mounted on individual axles and having fork-extension members mounted on each side of said wheels; socket members on said fork-extension members complementary to said socket members on said fork-shaped members; means for detachably joining all of said socket members with said respectively complementary socket members whereby a trailer is formed.

2. The invention of claim 1 wherein a load support member and a load fastening member are affixed to said tongue member, and a pair of load support members comprising angularly adjustable uprights and means for suspending a load between said uprights are mounted on said left and right load support members.

3. The trailer claimed in claim 1 including extension means comprising a plurality of longitudinal members equal to the number of members in said tongue member; means for joining said extension members in a spaced relationship whereby socket members on said extension member complementary to the socket members in the tongue member and in the left and right frame members may be detachably joined to form an extended trailer.

4. A trailer comprising a tongue member carrying a front load support and a trailer hitch; a left frame member including a fork-shaped member and a resiliently mounted load support member; a right frame member including a fork-shaped member and a resiliently mounted load support member; a pair of wheels rotatably mounted on individual axles having fork extension members mounted on each end thereof; means for detachably joining said fork-shaped members and said fork extension members; means for detachably joining said left and right frame and load support members; means for detachably joining said joined left and right frame members with said tongue member whereby a trailer is formed; means mounted on said left and right resiliently mounted load support members comprising a pair of upright members pivotally fixed at their lower ends to respective said load support members, the upper ends thereof being adjustable to accommodate variable width loads; and means for supporting said loads between said upright members and free of said resiliently mounted load support members.

5. A trailer comprising a tongue member carrying a front load support and a trailer hitch, a left frame member including a fork-shaped member and a load support member, a right frame member including a fork-shaped member and a load support member, a pair of wheels rotatably mounted on individual axles having fork extension members mounted on each end thereof, means for detachably joining said fork-shaped members and said fork extension members, means for detachably joining said left and right frame and load support members, means for detachably joining said joined left and right frame members with said tongue member whereby a trailer is formed, means mounted on said left and right load support members comprising a pair of upright members pivotally fixed at their lower ends to respective said load support members, the upper ends thereof being adjustable to accommodate variable width loads, and means for supporting said loads between said upright members and free of said load support members.

References Cited in the file of this patent

UNITED STATES PATENTS

| | | |
|---|---|---|
| 471,042 | Warren | Mar. 15, 1892 |
| 711,402 | Keyes | Oct. 14, 1902 |
| 954,317 | Martin | Apr. 5, 1910 |
| 1,779,887 | Melanson | Oct. 28, 1930 |
| 1,939,863 | Seiter | Dec. 19, 1933 |
| 2,388,304 | Ackerman | Nov. 6, 1945 |
| 2,444,231 | Sanford | June 29, 1948 |
| 2,503,535 | Yarbrough | Apr. 11, 1950 |
| 2,571,213 | Cunningham | Oct. 16, 1951 |
| 2,594,540 | Cole | Apr. 29, 1952 |
| 2,608,418 | Finlayson | Aug. 26, 1952 |
| 2,644,176 | Livermon | July 7, 1953 |
| 2,742,300 | Carver | Apr. 17, 1956 |
| 2,848,252 | Martin | Aug. 19, 1958 |

FOREIGN PATENTS

| | | |
|---|---|---|
| 624,033 | Great Britain | May 26, 1949 |